United States Patent [19]

Leenhouts

[11] 4,125,801

[45] Nov. 14, 1978

[54] PRESETTABLE NUMBER TO STEP MOTOR CONTROL SYSTEM

[75] Inventor: Albert C. Leenhouts, Harwinton, Conn.

[73] Assignee: The Superior Electric Company, Bristol, Conn.

[21] Appl. No.: 826,612

[22] Filed: Aug. 22, 1977

[51] Int. Cl.² .................................................. H02K 37/00
[52] U.S. Cl. .................................................. 318/696
[58] Field of Search .......................... 318/685, 696, 138

[56] References Cited

U.S. PATENT DOCUMENTS

| | | | |
|---|---|---|---|
| 3,411,058 | 11/1968 | Madsen et al. | 318/696 |
| 3,476,996 | 11/1969 | Fredriksen | 318/696 |
| 3,899,729 | 8/1975 | Emery | 318/696 |
| 4,075,544 | 2/1978 | Leenhouts | 318/696 |

Primary Examiner—Gene Z. Rubinson
Attorney, Agent, or Firm—Ernest M. Junkins

[57] ABSTRACT

A system for accepting a number and causing the same number of steps to be produced by a stepping motor with the motor essentially linearly accelerating to a settable maximum velocity and then linearly decelerating in small velocity changes to the end of the movement with the deceleration duration being inversely related to the maximum velocity.

12 Claims, 4 Drawing Figures

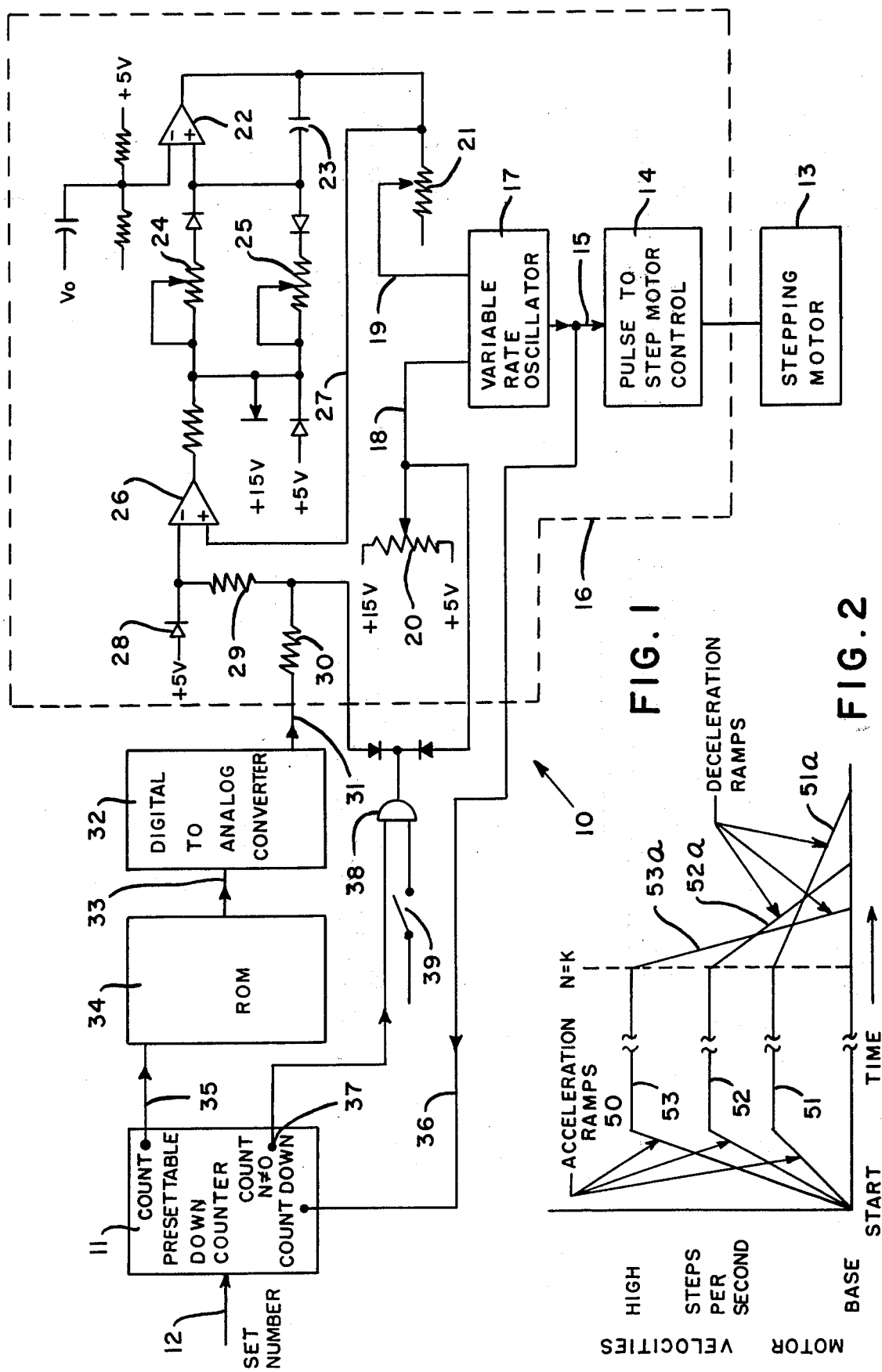

PRESETTABLE NUMBER TO STEP MOTOR CONTROL SYSTEM

In U.S. Pat. No. 3,411,058, assigned to the assignee of the present invention, there is disclosed a system for causing a stepping motor to produce the same number of steps to which a counter is preset. The initial portion of the movement is generally utilized to accelerate the motor from its starting speed and the final portion to decelerate the motor to a stop with the intermediate portion of the movement being at a maximum settable velocity. Acceleration is easily accomplished by fairly well known techniques while deceleration is selected to begin when there is a predetermined number of steps remaining in the movement as indicated by the instantaneous count of the counter. In most instances, it is desired to minimize the time for a movement within the limitation that the number of steps produced must exactly equal the preset number and thus the motor's acceleration and deceleration rates together with its maximum velocity must be within the motor's ability to respond to each change of energization of its windings to produce a step.

However, as said systems may be used with a number of different motor sizes under a wide variety of operating conditions and/or loads, it is preferred that the acceleration and deceleration movements be capable of being adjustable to accommodate the system to each individual usage. Such adjustments should include the ability to alter the acceleration ramp, the deceleration ramp and the number of steps required for deceleration all in relation to, or independently of, the said intermediate maximum velocity.

It is accordingly an object of the present invention to provide a system for accepting a presettable number of steps and causing a stepping motor to produce a movement having the same number of steps with the system having adjustments for enabling it to be easily adapted to each specific application.

Another object of the present invention is to achieve the above object with a system in which the number of steps in the deceleration movement may be easily adjusted, in which the deceleration ramp is essentially linear with both being adjustable independently of the intermediate maximum velocity and in which the time for the deceleration movement is inversely related to the maximum velocity to thereby provide a lesser duration for deceleration from a high velocity than from a low velocity for deceleration movements having the same number of steps.

A further object of the present invention is to provide a number of step motor control system which is economical to manufacture, reliable in use and conveniently connectable with an existing pulse to step motor energizing circuit.

In carrying out the present invention, the system includes, as in the prior art systems, a presettable down counter, a variable oscillator for producing command pulses and a pulse to step motor winding energizing circuit that changes the windings' energization for each command pulse in order to produce a step. By varying the rate of the oscillator, the motor speed is accordingly varied as each command pulse is essentially simultaneously converted into a change of winding energization. Further, each command pulse also decreases the count of the counter that had been preset to the number of desired steps so that the instantaneous counter count represents the number of steps remaining in the movement.

In the present invention, the instantaneous counter count is applied to a programmed memory which, for each of the counter counts up to a maximum number of 2,000 steps, will provide a binary velocity number between 0 and 127 with the binary number selected being related to the square root of the counter count. The binary number is converted by a digital to analog converter into a voltage that directly controls the rate of the oscillator with the oscillator thus being capable of producing 127 different rates. As the instantaneous count decreases, the instantaneous rate of the oscillator accordingly is made to decrease to provide an essentially linear stepless deceleration.

While the system's maximum deceleration movement is set at 2,000 steps, a different number of steps is effectively obtained by incorporating in the ditigal to analog converter, a variable gain amplifier. Thus, one of the binary numbers and hence its corresponding instantaneous count may be selected to produce an analog voltage that maintains the oscillator producing command pulses at the maximum velocity until the count that is related to the binary number is reached. However, as the counter count decreases therefrom, the same gain is applied to the decreasing voltage values produced by each decreasing binary number and hence the deceleration occurs essentially linearly from the selected binary number count. The ability to set the number of steps in the deceleration movement is accordingly caused to be independent of the intermediate maximum velocity at which the motor is desired to operate.

However, the maximum rate of the intermediate portion of the movement has been found to control the duration of the deceleration movement. For the same number of steps selected by the gain control for deceleration to occur, a low maximum velocity will require a longer duration for the deceleration movement than a high maximum velocity because the low velocity has a fewer number of steps than the high velocity for a same identical time interval. While this inverse relationship to the intermediate velocity may appear incongruous to generally accepted techniques of varying the time for deceleration movement directly with the maximum velocity value, this inverse relationship has been found to be more accommodative to general applications in reducing the total time for a movement than such heretofore known techniques.

Other features and advantages will hereinafter appear.

In the drawing:

FIG. 1 is a block and schematic diagram of the present invention.

FIG. 2 is a chart showing velocity versus time for different maximum velocities.

Figure 3A:
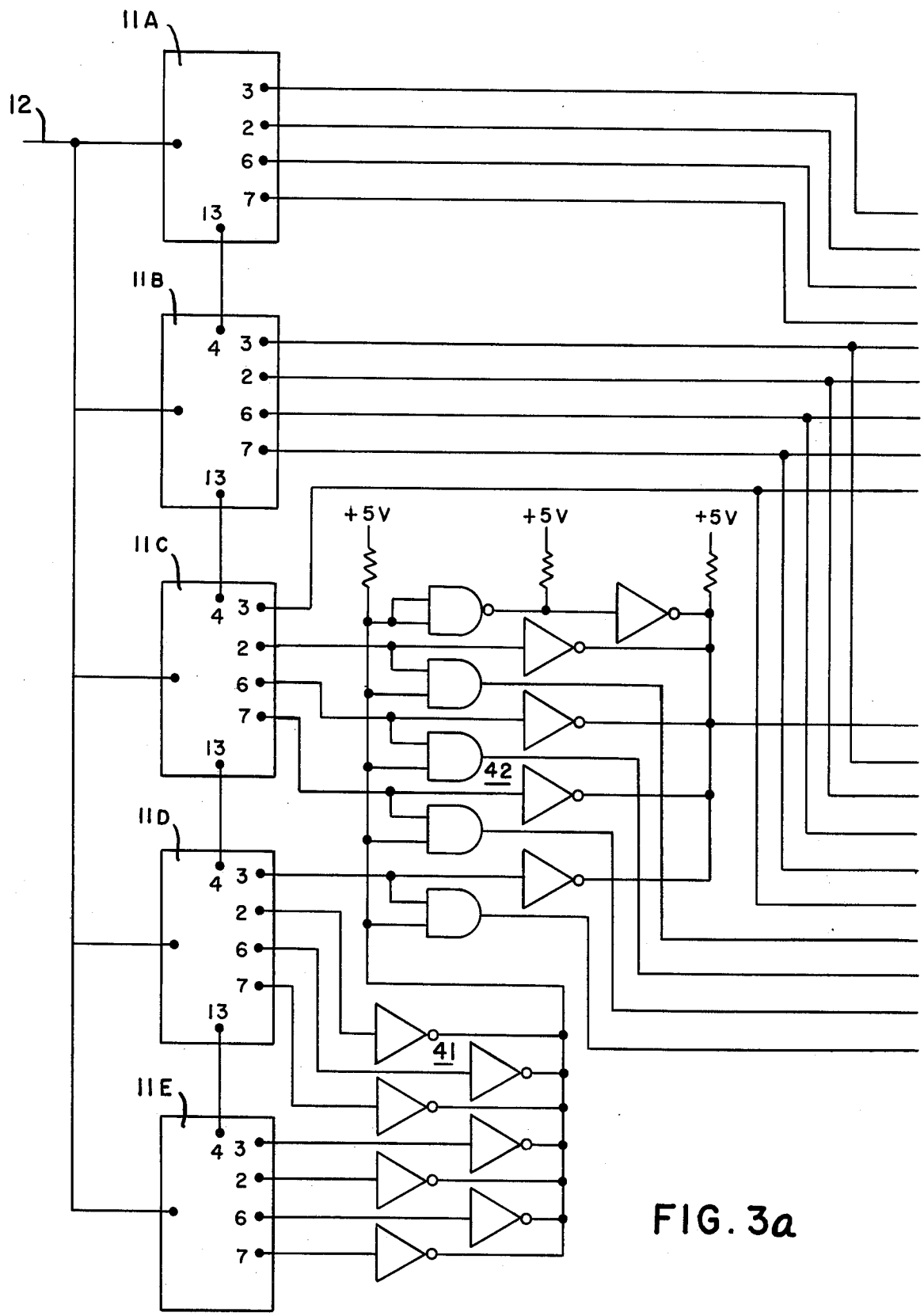
FIGS. 3a and 3b are a schematic and block diagram of portions of the system shown in FIG. 1.

Referring to the drawing, the system of the present invention is generally indicated by the reference symbol 10 and includes a presettable down counter 11 into which a set number on a symbolic line 12 may be entered to set the counter count. The number is the desired number of steps in a movement which a stepping motor 13 is to produce. A pulse to step motor control 14 is provided which translates each command pulse received on a lead 15 into a change of energization of the windings of the stepping motor 13 to produce a step, either in a forward or reverse direction, as commanded.

The pulse to step motor control 14 is enclosed within a dotted line 16 to indicate that it is part of a pulse to step stepping motor control circuit disclosed in my copending application Ser. No. 797,150, filed May 16, 1977. In this circuit, command pulses are internally produced by a variable rate oscillator 17 whose rate is directly related to the sum of the currents occurring in a base speed lead 18 and a run speed lead 19. The lead 18 is connected to an adjustable resistor 20 which controls the base or minimum speed at which the command pulses are produced. The run speed lead 19 is connected to an adjustable resistor 21 which sets the maximum intermediate rate at which the command pulses will be produced and hence the maximum motor velocity. The resistor 21 is connected to the junction of the output of an operational amplifier 22 and a capacitor 23 which are connected, as shown, to an acceleration ramp adjusting resistor 24 and a deceleration ramp adjusting resistor 25. These in turn are jointly connected to the output of another operational amplifier 26 having a positive terminal connected by a lead 27 to the junction of the amplifier 22 output and the capacitor 23 and an inverting terminal connected to both a positive voltage source +5V through a diode 28 and through resistors 29 and 30 to the output 31 of a digital to analog converter 32.

The input to the converter 32 is on a symbolic lead 33 from the output of a ROM 34 where the lead 33 represents individual wires each capable of transmitting a binary state, so that essentially 128 different possible binary number representations are capable of being presented to the converter 32. The counter 11 has its count continually transferred as an input to the ROM 34 over a symbolic lead 35 and, as will be hereafter understood, the ROM converts the count into one of the binary velocity numbers on the lead 33. In addition, the counter 11 has a count down terminal connected by lead 36 to the lead 15 so that each command pulse on lead 15 causes the count of the counter to decrease by one. The counter further has an N≠0 terminal 37 which is connected as one input of an AND gate 38 while the other input of the gate is connected to a start switch 39.

The output of the gate 38 is connected through the resistor 29 to the operational amplifier 26 and also to the lead 18. Whenever the counter 11 has a count and the switch 39 is closed, the output of the gate 38 is positive, permitting current to flow through both leads 18 and 19 to control the rate of the command pulses. Whenever both conditions to the gate 38 do not occur simultaneously, then the system does not produce command pulses and hence the motor is stopped.

Figure 3B:
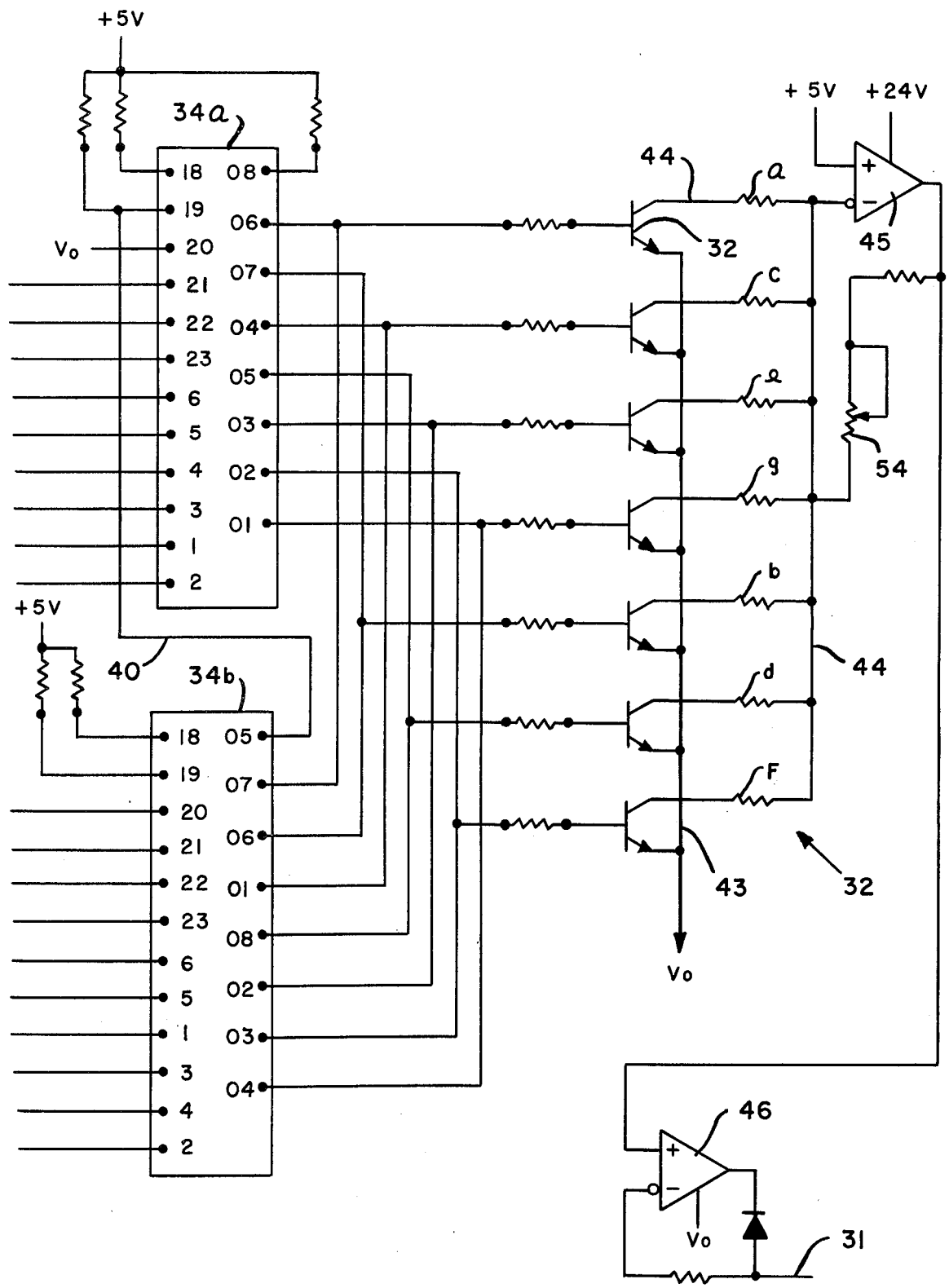

Referring to FIGS. 3a and 3b there is shown in block and schematic form when the two FIGS. are placed adjacently, the down counter 11, ROM memory 34 and converter 32. The counter 11, in the herein illustrated embodiment, includes five decades 11A, 11B, 11C, 11D and 11E, each of which stores in binary representation the decimal number for units, tens, hundreds, thousands and ten thousands, respectively.

The count terminals of the decade counters are connected as shown as inputs to the ROM which consists of two portions 34a and 34b. The portion 34a is enabled, by a lead 40, only when the count is between 0 and 199 while for counts between 200 and 2,000, the maximum number of steps capable in the herein specifically disclosed system deceleration movement, the portion 34a is disabled and only the portion 34b provides the binary representations corresponding to the counts.

A circuit 41, consisting of a plurality of open collector inverters connected as shown, is utilized to sense any count of the counter 11 that is greater than the maximum number and provides a signal which disables both ROM portions 34a and 34b. Another circuit 42 connected as shown and consisting of the indicated gates and inverters is connected to the ROM 34b, at specifically terminal 20 thereof and it senses whether or not the counter count is 200 or more, and if so, provides a signal to the ROM portion 34b which enables it. Thus, for counts of 0-199 only portion 34a provides the binary numbers while for counts between 200 and 2,000, only portions 34b functions to produce the binary numbers and for counts above 2,000, both ROM in effect function to maintain the output at the highest binary number.

While the ROM 34 is shown as two individual units, a single ROM unit may be employed if it has sufficient capacity. It is also noted that portion 34a provides binary number of 0-39 while portion 34b provides numbers 40-127 on the seven parallel connected output leads of the ROMs to the converter.

The converter 32 may take any convenient form for altering a binary number into a directly related value of voltage. Herein, the converter includes seven resistors, a through g inclusive, which are parallelly connected between a ground lead 43 and a lead 44 connected to the inverting input of an operational amplifier 45. A switching transistor is connected in series with each resistor with the base of each transistor being connected to one of the output leads of the ROMs. The transistor connected to the resistor a is indicated by the reference character 32a. The values of the resistors is graduated with a having 160k ohms; b, 80k ohms; c, 40k ohms, etc. and g, 2.5k ohms. Thus by controlling the switching of each of the transistors, 127 different resistance values may be connected between the leads 43 and 44.

The output voltage of the amplifier 45 is inversely proportional to the connected resistance value. For the highest binary representation of 127, all resistors are connected and the output voltage is high while for the number 1, only the resistor a is connected and the output voltage is low. The output of the amplifier 45 is connected to the + input of an operational amplifier 46 whose output appears on the lead 31. This amplifier 46 basically functions only as a linear amplifier so as to have the voltage on the lead 31 be directly related to the output voltage of the amplifier 45.

A low voltage on the lead 31 when applied to the amplifier 26 will cause the output of the amplifier 22 to have a high output voltage which produces a high current flow to the adjustable oscillator 17 and hence a high rate of command pulses. As explained in my previously noted application, the resistor 21 sets the maximum high rate while the resistor 24 is capable of setting the acceleration ramp. Thus, upon initiation of a command to start by closing the switch 39, the current to the oscillator will initially only be from the base speed lead and then there will be an increasing flow from the lead 19 until it reaches the limit set by the resistor 21 at which time the system will provide the intermediate high velocity.

Upon the number of steps remaining being less than 2,000, the voltage on the lead 31 begins to decrease which causes the output of the amplifier 22 to decrease and less current flows in lead 19 so that the rate of command pulses is reduced to the base rate and stops when the count becomes zero. The deceleration ramp is settable by the adjustable resistor 25.

It will be understood that the voltage value in the lead 31 has 128 possible values which provides 127 different command pulse rates. This large number of possible rates has been found extremely advantageous as it prevents abrupt changes in the rate at which changes of energization of the motor are required and hence minimizes the possibility of the motor not responding to a command pulse which in turn permits quicker, assured deceleration of the motor.

It is further desired that the deceleration rate be essentially linear and thus the binary velocity number is made to be essentially related to the square root of the count of the counter 11. This relationship is programmed in the ROM 34 as indicated in the diagram FIGS. 3a and 3b showing the interconnection of the terminals. Representative relationships are a count 1,990 or more producing the binary number of 127; counts between 1970-1990, the number 126, it being noted that units of the count in this high range are disregarded; 1940-1960, 125; 1910-1930, 124; 1240-1250, 100; 790-800, 80; 450, 60; and 200, 40. For counts below 200, the portion 34b becomes effective and thus units of the count are considered with counts of 189-199 producing the number 39; 112-118, 30; 50-54, 20; 12-14, 10; 6-7, 7; 5, 6; 3-4, 5; 2, 4; 1, 3; and 0-1, 2. The latter numbers are essentially neglected because it is the base rate speed at which the last one or two steps are produced and it is set by the base speed resistor 20. Thus, for any count of the counter less than 2,000, the corresponding approximate binary number can be obtained by multiplying the square root of the count times the ratio of 128 divided by the square root of 2,000.

Shown in FIG. 2 is a graph depicting the motor's velocities vs. time for three different maximum velocities. Each has a deceleration that begins with the same count (N) of the counter and each has the same setting of the deceleration ramp resistor 25. The time for the acceleration ramp 50 is identical for all three velocities 51, 52, and 53 and hence all linearly accelerate to their set intermediate velocity in the same duration. However, deceleration for the low velocity 51, as indicated by the line 51a, requires a longer duration than deceleration for the high velocity 53 as indicated by the line 53a. Thus the present system varies the duration in which deceleration occurs in accordance with the maximum velocity.

As pointed out heretofore, while the natural assumption is that a higher velocity should require a long deceleration time, Applicant has found that motors normally operated at the higher velocities have a capacity to decelerate faster than motors typically operated at low velocities. The reduction in deceleration time, decreases the time for a movement over heretofore known systems by being more accommodative to the ability of the stepping motor.

While the above disclosure has limited the extent of the deceleration movement to only the maximum of 2,000 steps, the present invention enables the number of decelerating steps to be easily altered. Referring to FIG. 3b, an adjustable resistor 54 is connected between the output of the amplifier 45 and its inverting input 44. This resistor functions to control the gain of the amplifier 45 so that when set at its minimum value, the amplifier has its least gain and hence the velocity number of 127 is required to provide 15 or so volts on the lead 31 to enable the system to operate at the velocity set by the resistor 21. As more of the resistor 54 is placed in the connection, the amplifier's gain increases and hence the resistance produced by a lower binary velocity number is capable of producing the 15 or so volts on the lead 31. Though it is a velocity number that is selected at which the voltage on the lead 34 begins to decrease, the net effect is to begin the deceleration movement at the count or count range where the selected velocity number occurs.

Typical types of components that may be used are decade counters, type 74LS192; ROM, type 82S115 and operational amplifiers type 72558.

The constant duration for acceleration irrespective of the maximum velocity setting is caused by the output of the amplifier reaching its maximum output voltage, within the time limit set by the capacitor 23 and resistor 24. When the maximum voltage is attained, the maximum velocity is also attained, irrespective of the setting of the resistor 21. The duration, as disclosed in my above-noted application may be adjusted by the resistor 24. The deceleration circuit herein accordingly does not alter this functioning of the motor control circuit 16.

It will accordingly be understood that there has been disclosed a number to step motor control system which is capable of accepting a number and causing a stepping motor to produce the same number of steps. The motor is accelerated linearly to a settable maximum velocity and then is decelerated to stop at the end of the movement. The deceleration is caused to be linear with the incremental changes in the decreasing velocity being small and with the duration of the decelerating movement being inversely related to the value of the maximum velocity. Accordingly, the present invention enables a faster deceleration from a higher velocity than a lower velocity by being more related to the ability of the motor than heretofore known appropriately acting systems.

Variations and modifications may be made within the scope of the claims and portions of the improvements may be used without others.

I claim:

1. A system for accepting a number and causing a stepping motor to produce a movement having the same number of steps comprising a stepping motor means for producing a step essentially simultaneously with the receipt of a command pulse, variable rate oscillator means for producing command pulses, counter means for maintaining a count of the number of steps to be produced, means for directing the oscillator means to increase the rate of the command pulses at the beginning portion of the movement and means for directing the oscillator means to decrease the rate of the command pulses at the ending portion of the movement in accordance with essentially the square root of the count whereby the motor speed decreases essentially linearly.

2. The invention as defined in claim 1 in which the variable rate oscillator means produces a rate related to the value of an oscillator signal, in which the decreasing means includes means for providing a relative signal essentially representing each individual count in the decreasing movement and to which the value of the oscillator signal is related.

3. The invention as defined in claim 2 in which there are means for adjusting the relative ratio between the values of the relative signal and the oscillator signal and for maintaining the same ratio for all the steps in the decreasing movement.

4. The invention as defined in claim 2 in which the oscillator means produces command pulses at a maximum rate with a selected maximum value of oscillator signal and in which there are adjusting means for enabling substantially any one of the related signals to produce an oscillator signal having its selected maximum value whereby the number of steps in the decreasing movement may be altered.

5. The invention as defined in claim 2 in which the relative signal means is operable to produce relative signals for counts below a fixed count.

6. The invention as defined in claim 5 in which the ratio of the fixed count to the number of relative signals is on the order of ten to one.

7. The invention as defined in claim 2 in which the relative signal means provides the same relative signal for a wide range of counts for the higher counts.

8. The invention as defined in claim 2 in which the relative signal means provides the same relative signal for a narrow range of counts for the fewer counts.

9. The invention as defined in claim 2 in which the relative signal means includes a memory means programmed to provide a different binary representation for each different relative signal.

10. The invention as defined in claim 9 in which the relative signal means includes means for converting each different binary representation in a decreasing movement into a different analog voltage with said analog voltage constituting the relative signal.

11. The invention as defined in claim 10 in which the converting means includes adjustable means for adjusting the ratio of the conversion.

12. The invention as defined in claim 1 in which there are means for setting the maximum rate of the oscillator pulses and in which the means for decreasing the rate of the command pulses causes higher maximum rates to require a lesser duration for the ending portion than lower maximum rates.

* * * * *